(12) United States Patent
Salmenkaita

(10) Patent No.: US 7,388,897 B2
(45) Date of Patent: Jun. 17, 2008

(54) DATA TRANSMISSION METHOD, SYSTEM AND NETWORK ELEMENT

(75) Inventor: Matti Salmenkaita, Malaga (ES)

(73) Assignee: Nokia Corporation, Espoo (FI)

( * ) Notice: Subject to any disclaimer, the term of this patent is extended or adjusted under 35 U.S.C. 154(b) by 767 days.

(21) Appl. No.: 10/465,790

(22) Filed: Jun. 20, 2003

(65) Prior Publication Data

US 2004/0228388 A1 Nov. 18, 2004

(30) Foreign Application Priority Data

Apr. 25, 2003 (FI) ................................. 20030633

(51) Int. Cl.
*H04B 1/707* (2006.01)
(52) U.S. Cl. ....................................... 375/132; 455/423
(58) Field of Classification Search ................ 375/130, 375/132, 224, 354, 377; 455/423
See application file for complete search history.

(56) References Cited

U.S. PATENT DOCUMENTS 5,875,184 A * 2/1999 Altvater et al. ............... 370/330
2004/0203727 A1* 10/2004 Abiri et al. .................. 455/423

* cited by examiner

*Primary Examiner*—Temesghen Ghebretinsae
(74) *Attorney, Agent, or Firm*—Squire, Sanders & Dempsey L.L.P.

(57) ABSTRACT

A data transmission method in a telecommunication system utilizing frequency hopping and the system having a limit for allowable interference. The method includes performing at least two frequency hopping layers, each layer comprising one or more frequency hopping areas, the frequency hopping layers having frequency hopping parameters divergent from each other, setting the frequency hopping layers one on the other in such a way that the overlapping of the border zones of the frequency hopping areas is minimized, estimating interference in the system or in a predetermined part of the system, and if the interference is too high, transferring one or more users to another frequency hopping layer.

24 Claims, 5 Drawing Sheets

DATA TRANSMISSION METHOD, SYSTEM AND NETWORK ELEMENT

BACKGROUND OF THE INVENTION

1. Field of the Invention

The invention relates to a data transmission method and a network element such as a base station controller in a telecommunication system, the system utilizing frequency hopping.

2. Description of the Related Art

Frequency hopping consists of changing the frequency used by a channel at regular intervals. Frequency hopping is used to attenuate the influence of attenuation due to, for instance, Rayleigh fading. One advance achieved is interferer diversity: in high traffic areas the capacity of a cellular system is limited by its own interference caused by frequency reuse. The carrier-to-interference ratio may vary considerably between calls. The carrier level changes with the mobile station position relative to the base station, with the number of obstacles between them, etc. The interference level changes depending on whether the frequency is being used by another call in a nearby cell, and it also varies according to the distance to the interfering source, its level, etc. With frequency hopping, it is possible to circulate channels between users and thus shorten the time each user has a connection of poor quality.

Typically, in cellular networks, when frequency hopping is used, the interference is most considerable in the areas, where several cells having similar frequency hopping lists (MA list, mobile allocation frequency list) and different random hopping sequences are bordering each other. Another problem is due to the fact that cellular networks usually consist of multiple separate cell clusters. The interference is usually highest in the proximity of cell border areas where there are cells belonging to different cell clusters.

SUMMARY OF THE INVENTION

An advantage of the invention is to provide an improved method, system and network element utilizing frequency hopping. According to an aspect of the invention, there is provided a data transmission method in a telecommunication system, utilizing frequency hopping and having a limit for allowable interference, the method including performing at least two frequency hopping layers, having one or more frequency hopping areas, where the frequency hopping layers have frequency hopping parameters divergent from each other, setting the frequency hopping layers one on the other in such a way that the overlapping of the border zones of the frequency hopping areas is minimized, estimating interference in the system, or in the predetermined part of the system, if the interference is too high, and transferring one or more users to another frequency hopping layer.

According to another aspect of the invention, there is provided a network element utilizing frequency hopping, the network element including a component for performing at least two frequency hopping layers, each layer having one or more frequency hopping areas, where the frequency hopping layers have frequency hopping parameters divergent from each other, a component for setting the frequency hopping layers in a manner that overlapping of the border zones of the frequency hopping areas is minimized, a component for processing the interference information of the system or of the predetermined part of the system, and a component for transferring one or more users to another frequency hopping layer.

According to yet another aspect of the invention, a network element utilizing frequency hopping is configured to perform at least two frequency hopping layers, each layer having one or more frequency hopping areas. The frequency hopping layers have frequency hopping parameters divergent from each other and are set so that the frequency hopping layers overlapping of the border zones of the frequency hopping areas is minimized. The network element is configured to process the interference information of the system or of the predetermined part of the system, and transfer one or more users to another frequency hopping layer.

According to another aspect of the invention, there is provided a data transmission system using frequency hopping and having a limit for allowable interference, the data transmission system including a portion for performing at least two frequency hopping layers, each layer having one or more frequency hopping areas and having frequency hopping parameters divergent from each other, a portion for setting the frequency hopping layers one on the other in such a way that overlapping border zones of the frequency hopping areas is minimized, a portion for measuring interference in the system or in the predetermined part of the system and comparing the interference to the limit, and a portion for transferring one or more users to another frequency hopping layer.

Further embodiments of the invention are described in the dependent claims.

The methods and systems of the invention provide several advantages. For example, in a preferred embodiment of the invention, a network can provide a user with a connection that is less affected by interference caused by frequency hopping and therefore there is less speech quality degradation in the network. Since there are more usable connections available, a higher spectral efficiency can be achieved and therefore also capacity is increased.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
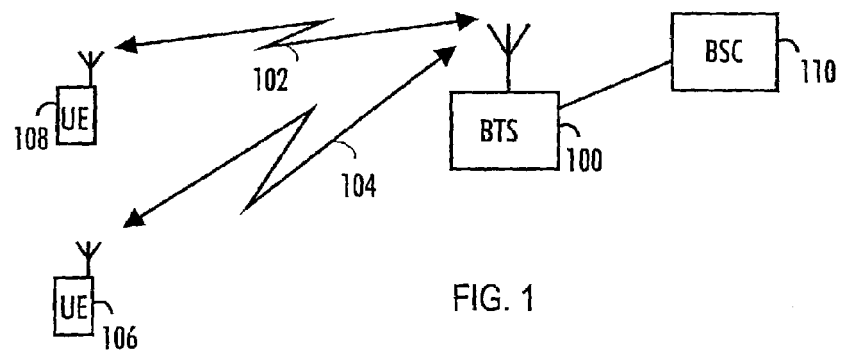
FIG. 1 shows an example of a telecommunication system.

With reference to FIG. 1, we examine an example of a data transmission system in which the preferred embodiments of the invention can be applied. The present invention can be applied in various wireless communication systems using frequency hopping. One example of such communication system is GERAN or GSM/EDGE radio access network. It is a radio access network which includes GPRS and EDGE technologies and can be connected to a UMTS core network, thus enabling real-time IP-based services which are, for example, IP telephony (IPT), IP-based streaming and IP-multimedia.

As used herein, frequency hopping means a technique in which the temporary carrier frequency of a signal is periodically changed to other positions in a predetermined way within a selected frequency spectrum that is wider than the minimum requirement for transmission.

It is clear to a person skilled in the art that the methods according to the invention can be applied to systems utilizing different modulation methods or air interface standards. FIG. 1 is a simplified illustration of a digital data transmission system to which an embodiment of the invention is applicable. This is a part of a cellular radio system, which comprises a base station 100, which has bi-directional radio links 102 and 104 to subscriber terminals 106 and 108. The subscriber terminals may be fixed, vehicle-mounted or portable. The base station includes one or more transceivers having a connection to an antenna unit, which establishes the bi-directional radio links to the subscriber terminal. The base station may further be connected to a base station controller 110, which transmits the connections of the terminals to the other parts of the network. The base station controller may control, in a centralized manner, several base stations connected to it.

The cellular radio system can also communicate with other networks such as a public switched telephone network or the Internet.

Figure 2:
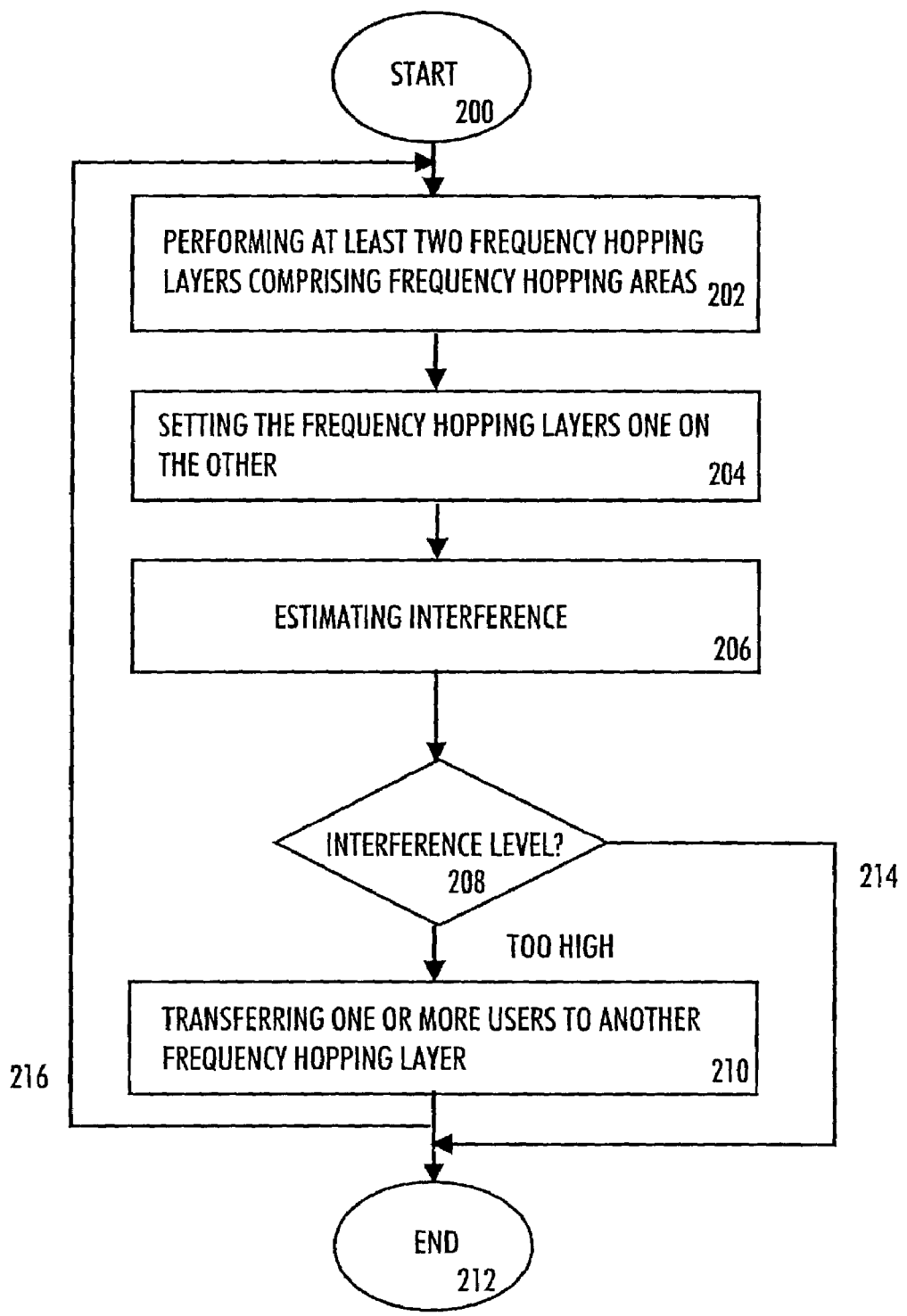
FIG. 2 is a flow chart.

FIG. 2 is a flow chart of an example embodiment according to the invention. The embodiment is a method applicable to telecommunication systems using frequency hopping. It is preferable that the telecommunication system is also synchronized. This embodiment utilizes several frequency hopping layers that interfere with each other as little as possible. Preferably, the interference is controlled by applying MAIO/HSN cluster planning within a base station cluster, the cluster meaning a group of base stations synchronized with each other, in other words base stations are using the same frequency hopping sequence but starting from different frequencies in order not to use the same frequency at the same time. MAIO (mobile allocation index offset) is a hopping sequence starting point for radio time-slots which use the same mobile allocation frequency list but which are synchronized to use different frequencies at a time. HSN (hopping sequence number) is a parameter used in randomizing the hopping sequence. Typically, in GERAN-systems hopping sequence number 0 indicates cyclic hopping, numbers 1 . . . 63 indicate pseudo-random (randomized) hopping. Each hopping group may have a hopping sequence number (HSN) of its own.

It is possible to diminish the mutual interference within a synchronized cell cluster if the same transceiver-specific offset (MAIO) is used only once within the cell cluster. Thus in practice, the number of different offsets (MAIOs) is equal to the number of frequencies on the hopping list (MA list). Therefore the total number of transceivers in the cells that form the cell cluster cannot exceed the total number of frequencies on the frequency hopping list. This sets a limit to the cell cluster size. Therefore, a typical cellular network consists of multiple separate cell clusters, where mutual interference can be diminished within the cells in each cluster. However, there is still random interference between cells located in different clusters.

A limit to allowable interference can be set for the whole network, for each frequency hopping layer or for each connection, for instance. The limit is often determined by the air interface standard used.

The method starts at block 200. In block 202 at least two frequency hopping layers, including one or more frequency hopping areas, are performed. The frequency hopping layers preferably have frequency hopping parameters, such as MAIO and/or HSN, divergent from each other. A frequency hopping area may, for instance, be the same as a radio cell of a telecommunication system or a group of cells generated by base stations belonging to the same cluster (a group of cells may be called a cell cluster). Each layer of frequency hopping is preferably performed by separate transceivers.

In block 204 frequency hopping layers are set one on the other in such a way that overlapping of the border zones of the frequency hopping areas is minimized. This is preferred because the interference level is highest in the border zones of the frequency hopping areas. Therefore, in the areas where one frequency hopping layer suffers from high interference, there is another layer where there is less interference. The border zone is typically a cluster border zone (border zone of several clusters) or a frequency hopping area border zone.

In block 206 interference in the system or in a predetermined part of the system is estimated. There are several possibilities to estimate interference in a radio network. Estimating can be, for instance, based on carrier-to-interference ratio (CIR) measuring. CIR measurements are usually made periodically. CIR is an interference-specifying ratio used in microwave relays and other communication systems. CIR is usually estimated by measuring the desired signal, turning it off, and then measuring the undesired signal. The ratio of the two measurements is often expressed in decibels. The measuring is typically carried out in a user terminal. The measurement information can be processed in several network elements, such as a base station or a base station controller. In block 208 it is determined if the interference level is too high, for example, exceeding a predetermined threshold or limit set by an operator or determined in the standard, etc.

If the interference is too high, one or more users are transferred to another frequency hopping layer in block 210. The transferring is usually carried out by performing a handover. Handovers are well known in the art and therefore not explained here in more detail.

The supporting radio resource management functions try to find the most suitable frequency hopping layer in the initial channel allocation as well as in possible interference handovers. Because the frequency hopping layers are set on the top of each other in such a way that the overlapping is as small as possible, if a user is located in a cluster border zone or in a frequency hopping area border zone and thus subjected to interference, it is very likely to find for a user a connection, whose quality is acceptable in another frequency hopping layer.

Furthermore, different frequency hopping layers may have different frequency loads. The frequency load describes the overall utilization of one frequency channel. It may be defined, for instance, as a probability of a particular frequency being transmitted once in a cell. In this case, 100% frequency load implies that the frequencies are continuously transmitted in every cell. Therefore, the frequency load describes the level of interference present in one frequency hopping layer. Thus one layer with a higher frequency load can be better for user terminals utilizing link performance improvement features, such as AMR or SAIC, while the other layer with lower frequency load is more suitable for user terminals which do not use link performance enhancement methods. AMR (adaptive multi-rate channel coding) is a channel coding that adapts according to the prevailing channel conditions. The adaptation is based on received channel quality estimation in both a user terminal and a base transceiver station (BTS). SAIC (single antenna interference cancellation) is a radio receiver improvement using a signal processing algorithm that aims to reduce the detrimental impact of the dominant interference source. Similar improved interference canceling receivers can also be used in the base transceiver stations.

The hopping frequency band may be divided into sub-bands. The number of sub-bands is preferably the same as the number of layers. In many cases two layers is the best measure. Too narrow a hopping band may not be suitable for this solution, since the frequency hopping benefits are reduced if there is not enough frequencies on the frequency hopping list. In practice, typically 8 to 10 frequencies is the minimum recommended so as to avoid compromising with the frequency hopping benefits. However, the frequency hopping benefits may still be acceptable for fewer frequencies since it is possible that the benefits derived from frequency band division may outweigh the frequency hopping performance losses.

The method ends in block 212. Arrow 214 depicts the situation, where the interference level is not too high, while arrow 216 depicts one possibility of repeating the method.

In the following, additional example embodiments of the invention are explained with reference to FIGS. 3A-C and 4A-B.

Figure 3A:
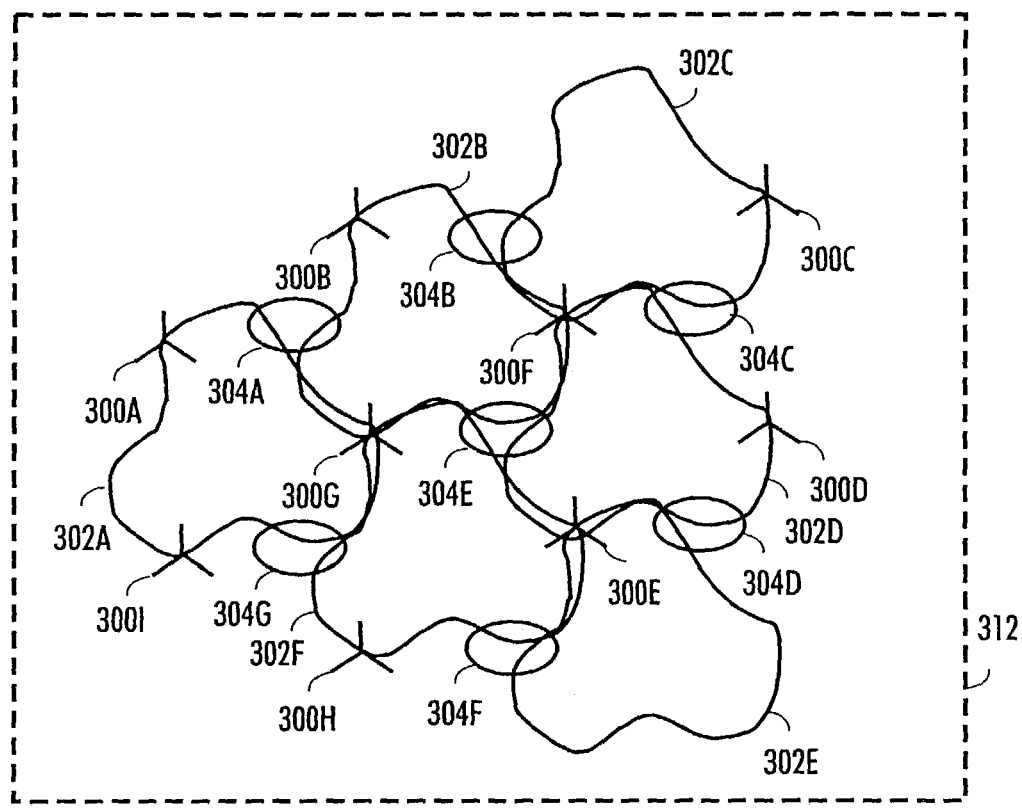
FIGS. 3A-C illustrate an example of a network.

FIG. 3A shows an example of one frequency hopping layer 312. Each frequency hopping area of the frequency hopping layer includes clusters (groups) of three radio cells. The base stations in this example of a cluster are synchronized with each other, meaning the base stations are using the same frequency hopping sequence but start from different frequencies in order not to use the same frequency at the same time.

Base stations 300A-I generate frequency hopping areas that in this example are clusters (groups) of three radio cells. Base stations 300A-I are sectorized base stations in order to generate more than one cell. Frequency areas are marked in the figure with reference numbers 302A-F. The shapes of the frequency hopping areas (radio cells) can naturally vary in practice. As can be seen, frequency hopping areas may also overlap in borders. The areas having the most interference, e.g., cluster border zones or frequency hopping border zones, are marked with reference numbers 304A-G.

Figure 3B:
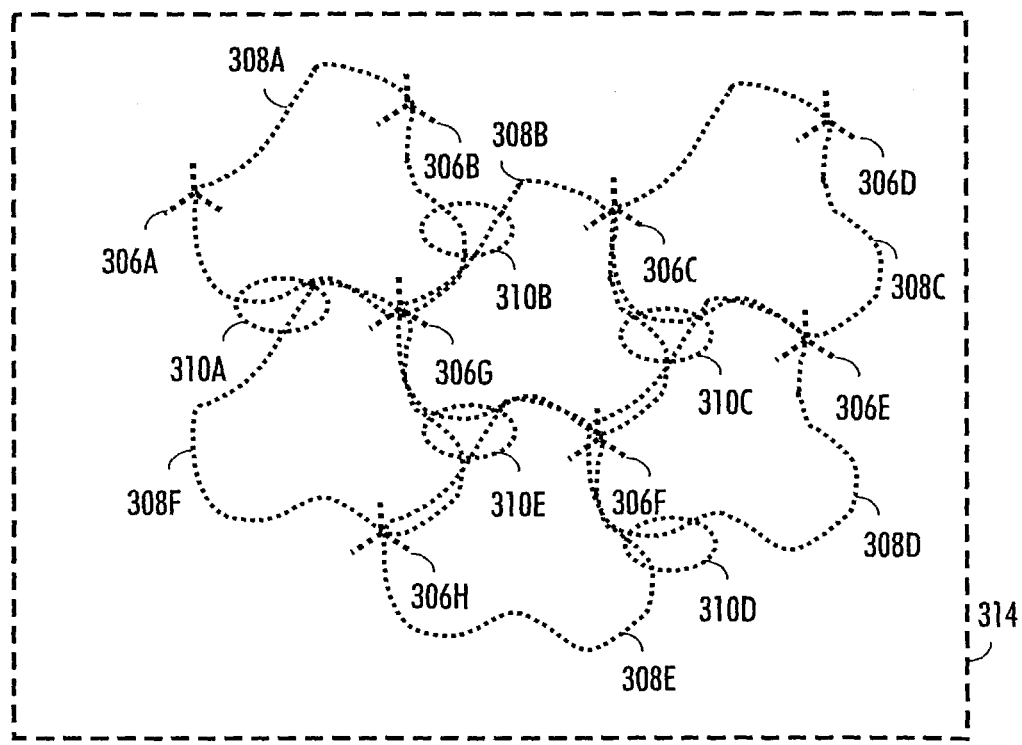

FIG. 3B shows an example of another frequency hopping layer 314. In this example, each frequency hopping area of the frequency hopping layer includes clusters (groups) of three radio cells. Base stations 306A-H generate radio cells. Base stations 306A-H are sectorized base stations in order to generate more than one cell. Frequency hopping areas are marked in the figure with reference numbers 308A-F. The shapes of the frequency hopping areas (and also radio cells) can naturally vary in practice. As can be seen, frequency hopping areas may also overlap in borders. The areas with the most interference, e.g., border zones, are marked with reference numbers 310A-E.

Figure 3C:
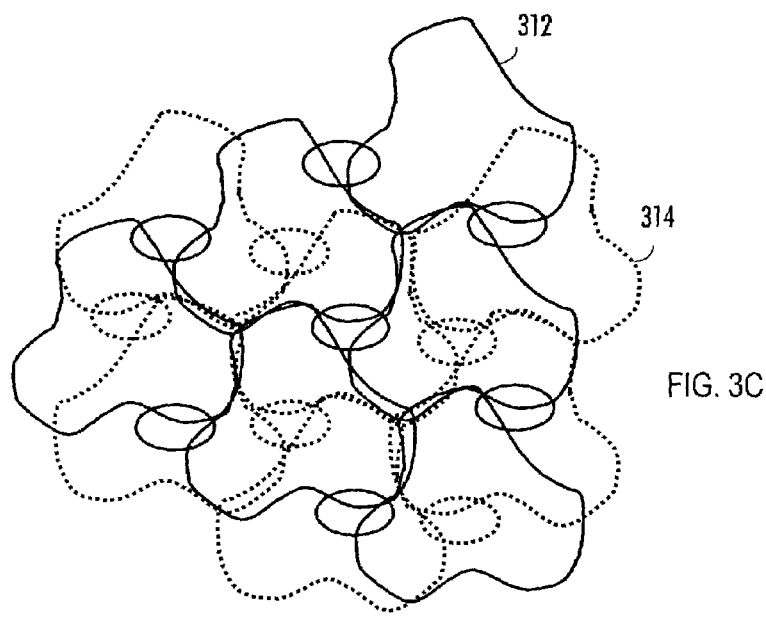

FIG. 3C shows a simplified example how these two frequency hopping layers 312, 314 can be set on top of each other in the way that the border zones (areas with the highest interference) do not significantly overlap. Some reference numbers as well as some other details shown in FIGS. 3A-B have been left out for the sake of clarity. The interference is controlled by applying MAIO/HSN cluster planning within each base station cluster. The frequency hopping layer 312 preferably has a different MAIO/HSN scheme than the frequency hopping layer 314. If the interference is too high in one area in the frequency hopping layer 312, the radio resource management unit transfers one or more users to another frequency hopping layer. The supporting radio resource management functions try to find the most suitable frequency hopping layer in the initial channel allocation as well as in interference reasoned handovers. Because the frequency hopping layers are set on top of each other in such a way that the overlapping is as small as possible, it is very likely to find for a user a connection whose quality is acceptable in another frequency hopping layer. For example, if a user is in a highly interfered area 304E of the frequency hopping layer 312, it can be seen in FIG. 3C that in the frequency hopping layer 314, there is not a border zone at the same place and therefore there is most probably less interference there. Accordingly, the user can be transferred to the frequency hopping layer 314.

Figure 4A:
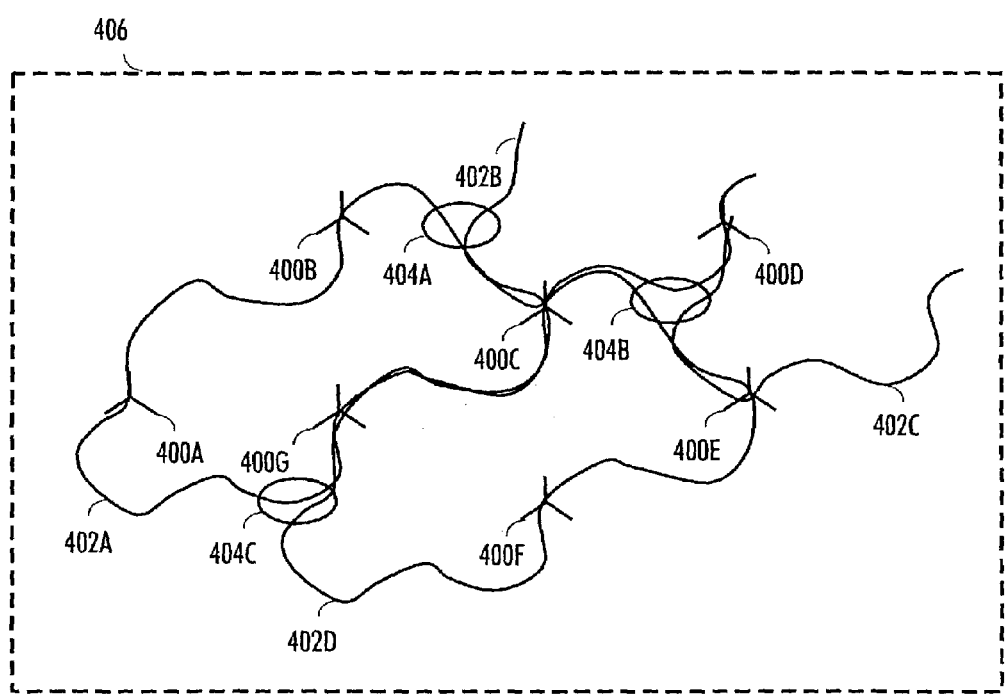
FIGS. 4A-B illustrate another example of a network.

FIG. 4A shows another example of a frequency hopping layer 406. In this case the cluster size is bigger (e.g., 6 cells). The bigger cluster size leads to reduced effective frequency reuse and consequently fewer areas where interference can be significant. Consequently, this arrangement may be more suitable for connections that do not employ link performance enhancement methods. Base stations 400A-G are preferably sectorized base stations to generate more than one cell. Frequency hopping areas are marked in the figure with reference numbers 402A-D. The shapes of the frequency hopping areas (radio cells) can naturally vary in practice, and as can be seen, may also overlap on borders. The areas, e.g., border zones, with the most interferences are marked with reference numbers 404A-C.

Figure 4B:
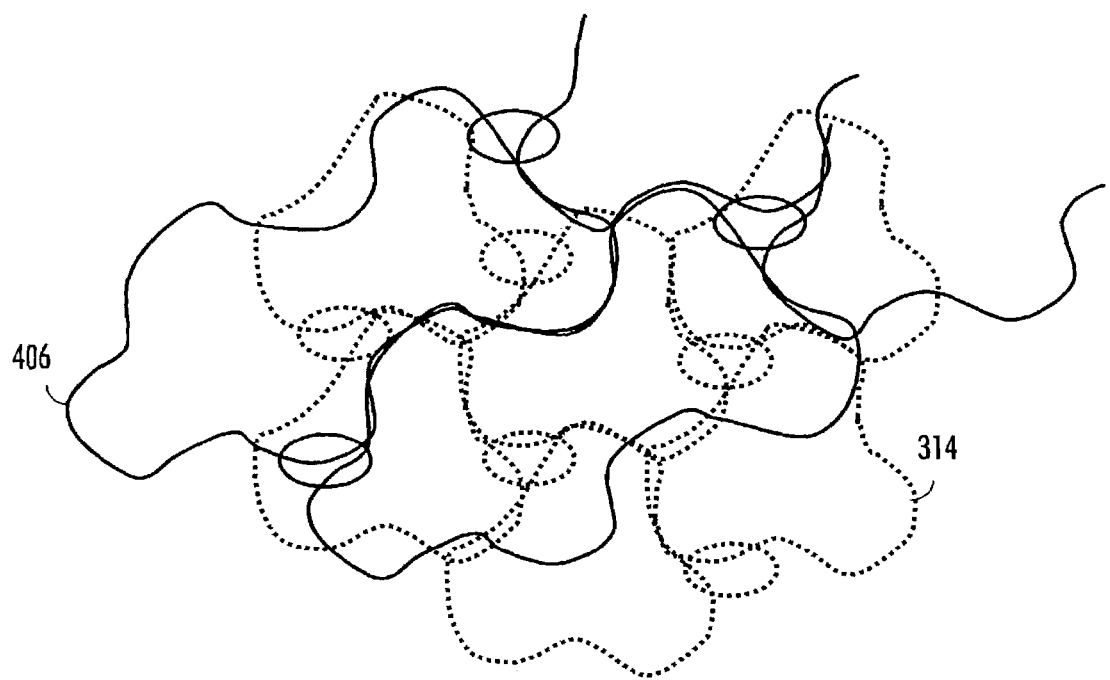

FIG. 4B shows a simplified example how these two frequency hopping layers 314, 406 can be set on top of each other in the way that the border zones (areas with the highest interference) do not overlap. Some reference numbers as well as some other details of FIGS. 3B and 4A have been left out for the sake of clarity. The interference is preferably controlled by applying MAIO/HSN cluster planning within each base station cluster. The frequency hopping layer 314 has a different MAIO/HSN scheme than the frequency hopping layer 406. If the interference is too high in one area in the frequency hopping layer 314, the radio resource management unit transfers one or more users to another frequency hopping layer. The supporting radio resource management functions try to find the most suitable frequency hopping layer in the initial channel allocation as well as in interference reasoned handovers. Because the frequency hopping layers are set on top of each other in such a way that the overlapping is as small as possible, it is very likely to find for a user a connection whose quality is acceptable in another frequency hopping layer. For example, if a user is in an highly interfered area 404C of the frequency hopping layer 406, it can be seen in FIG. 4B that in the frequency hopping layer 314, there is not a border zone at the same place and therefore there is most probably less interference there and the user can be transferred to the frequency hopping layer 406.

The frequency hopping layer 406 has less of a frequency reuse factor and may therefore be more suitable for user terminals that do not use link performance enhancement methods. In contrast, the frequency hopping layer 314 has a smaller cluster size and a tighter frequency reuse factor. Therefore layer 314 may be more suitable for user terminals using link performance enhancement methods, since they can tolerate higher levels of interference.

In the following, examples of frequency hopping layer selection algorithms are described in reference to FIGS. 3A-C and 4A-B. An algorithm suitable for channel allocation phase includes: if the user terminal requesting a channel allocation is able to use link performance enhancement such as AMR or SAIC, the connection is created in the frequency hopping layer 312 or 314, otherwise the selected layer is 406.

An algorithm suitable for an interference reasoned handover includes: if the connection in one frequency hopping layer is suffering from excessively poor quality caused by interference, a new channel is assigned from another frequency hopping layer whose border zones do not overlap with the border zones of the current frequency hopping layer. Since there is less interference in the new layer, the quality of the connection improves.

In the following, the algorithm for estimating CIR (carrier-to-frequency ratio) of a radio connection is explained in greater detail. CIR is usually estimated by measuring the desired signal, turning it off, and then measuring the undesired signal. The ratio of the two measurements is expressed in decibels. The measuring is typically carried out in a user terminal. The measurement information can be processed in several network elements, such as a base station or a base station controller.

The CIR estimation is based on the latest measurement report received from a user terminal. The measurement report includes the measured signal level from the serving cell and the strongest neighboring cell signal levels. Based on the cell identification information available in the measurement report and the network configuration database, RRM (radio resource management) function of the network can determine the hopping sequence number used in each of the neighboring cells in the frequency hopping layers. The RRM function is a group of functions of a mobile communication system used for establishment, maintenance and release of radio connections needed by mobile communication.

The cells with the same hopping sequence number used in the current frequency hopping layer in the serving cell belonging to the same MAIO/HSN cluster are not, in principle, causing interference to a user connection. However, the frequency hopping layers with different HSN and a frequency hopping list consisting fully or partly of the same frequency channels than those used in the serving frequency hopping layer in the serving cell, are causing interference to each other. The RRM function sums up the powers of the identified interfering signals and calculates an estimated CIR for each frequency hopping layer in the serving cell.

The algorithm using CIR estimation that is suitable for initial channel assignment is explained next. This algorithm utilizes a CIR estimation performed for both available frequency hopping layers. The CIR limit (a limit for allowable interference) can be set for the whole network, for each frequency hopping layer or for each connection. The CIR limit can depend on several parameters such as allowable link performance enhancements or a user priority class. Frequency hopping layer 314 employs smaller MAIO/HSN clusters and a tighter frequency reuse factor. Therefore it is more prone to generate interference. It is preferred to save less interfered resources of frequency hopping layer 406 in order to use them only when required. It is also preferred to assign the connections to frequency hopping layer 314 if the CIR requirements are fulfilled. If the interference level is too high, then the connection is assigned to frequency hopping layer 406. If the CIR level of frequency hopping layer 314 is over the set limit, but the CIR level of frequency hopping layer 406 is higher than that of frequency hopping layer 314, connection is assigned to frequency hopping layer 314.

In one embodiment, the CIR estimates can be improved by checking what time slots are in use in the interfering cells. When estimating interference, the interference level caused by unused time slots can be assumed to be zero. Additionally, the CIR estimation can be even further improved by accounting for a possible subscriber terminal or a base transceiver station transmission power reductions due to power control function.

The algorithm using CIR estimation that is suitable for interference reasoned handovers is explained. If the quality experienced by a user is deemed to be unsatisfactory the algorithm checks whether there is a frequency hopping layer where an estimated CIR is better than in the current frequency hopping layer. If such a frequency hopping layer is found, a handover to that frequency hopping layer is performed.

Figure 5:
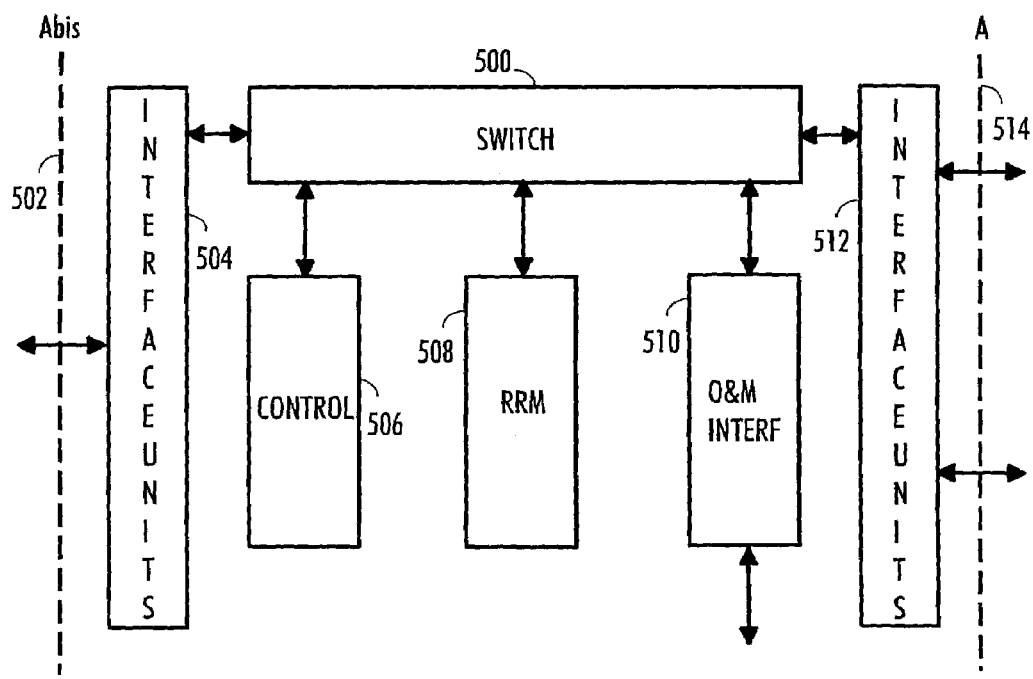
FIG. 5 shows an example of a base station controller.

Referring to FIG. 5, a simplified block diagram illustrates an example of the logical structure of a base station controller (or to some extent of a radio network controller). A base station controller is an example of a network element to which an embodiment of an invention can be applied. A base station controller BSC monitors several base stations, the number of which may vary. The main tasks of the BSC are frequency administration, the control of base stations and exchange functions. The BSC may be a standalone network element or part of another network element, such as a base station.

In a simplified manner it can be said that a BSC is a switch with a substantial computational capacity. The switching 500 takes care of the connection between the core network and the user terminal. In this example, the base station controller is located between the Abis 502 and A 514 interfaces. The network controller is connected to these interfaces via interface units 504, 512. Abis interface is between BSC and MSC (mobile services switching center). A MSC is a radio network element which performs the switching functions and controls the inter-working of a radio network with other networks such as a PSTN or the Internet.

The functionality of the radio network controller can be classified into two classes: radio resource management 508 and control functions 506. An operation and management interface function 510 serves as a medium for information transfer to and from network management functions. The radio resource management is a group of algorithms used to share and manage the radio path connection so that the quality and capacity of the connection are adequate. The significant radio resource management algorithms include handover control, power control, admission control, packet scheduling and frequency hopping control while the control functions take care of functions related to the set-up, maintenance and release of a radio connection between the base stations and the user terminals.

The radio resource management and control functions may carry out several functions including performing frequency hopping layers, controlling base stations to set the frequency hopping layers on top of each other in such a way that overlapping of border zones is minimized, processing the interference information of the system or of a predetermined part of the system and transferring one or more users to another frequency hopping layer, if needed.

The above-mentioned disclosed functionalities of the described embodiments of the data transmission methods according to the invention, can be advantageously implemented by programming functionality as software which is typically located in the radio resource management block and/or in the control block of a base station controller or of a corresponding device. The implementation can also be for instance an ASIC (Application Specific Integrated Circuit) component or other hardware configuration. A hybrid of these different implementations is also feasible.

Even though the invention is described above with reference to an example according to the accompanying drawings, it is clear that the invention is not restricted thereto but it can be modified in several ways within the scope of the appended claims.

The invention has been described herein only in context of example embodiments and implementations. Accordingly, the invention is not limited to these specific examples but rather by the scope of the appended claims and their legal equivalents.

Unless contrary to physical possibility, the inventor envisions that the elements of the respective embodiments may be combined in any manner and the sequences of the methods described herein may be performed in any order.

The invention claimed is:

1. A method of data transmission in a telecommunication system utilizing frequency hopping and the system having a limit for allowable interference, the method comprising:
providing at least two frequency hopping layers, each layer comprising one or more frequency hopping areas, the frequency hopping layers having frequency hopping parameters divergent from each other;
setting the frequency hopping layers one on the other in such a way that overlapping of border zones of the frequency hopping areas is minimized;
estimating interference in the system or in a predetermined part of the system; and
if the interference is too high,
transferring one or more users to another frequency hopping layer,
wherein the frequency hopping areas are at least essentially of a same size as radio cells of the telecommunication system.

2. The method of claim 1, wherein the telecommunication system is synchronized allowing synchronous utilization of frequency hopping sequences.

3. The method of claim 1, wherein the frequency hopping parameters of the frequency hopping layers differ from each other in such a way that layers do not interfere with each other.

4. The method of claim 1, wherein the frequency hopping layers have different frequency reuse factors.

5. The method of claim 1, wherein a used frequency hopping band is divided into the frequency hopping layers.

6. A method of data transmission in a telecommunication system utilizing frequency hopping and the system having a limit for allowable interference, the method comprising:
providing at least two frequency hopping layers, each layer comprising one or more frequency hopping areas, the frequency hopping layers having frequency hopping parameters divergent from each other;
setting the frequency hopping layers one on the other in such a way that overlapping of border zones of the frequency hopping areas is minimized;
estimating interference in the system or in a predetermined part of the system; and
if the interference is too high,
transferring one or more users to another frequency hopping layer, wherein the frequency hopping areas are of the same size as a cell cluster comprising a predetermined number of radio cells of the telecommunication system.

7. A method of data transmission in a telecommunication system utilizing frequency hopping and the system having a limit for allowable interference, the method comprising:
providing at least two frequency hopping layers, each layer comprising one or more frequency hopping areas, the frequency hopping layers having frequency hopping parameters divergent from each other;
setting the frequency hopping layers one on the other in such a way that overlapping of border zones of the frequency hopping areas is minimized;
estimating interference in the system or in a predetermined part of the system; and
if the interference is too high,
transferring one or more users to another frequency hopping layer,
wherein the interference estimating comprises carrier-to-interference (CIR) measuring.

8. A network element utilizing frequency hopping, the network element comprising:
providing means for providing at least two frequency hopping layers, each layer comprising one or more frequency hopping areas, the frequency hopping layers having frequency hopping parameters divergent from each other;
setting means for setting the frequency hopping layers in such a way that overlapping of border zones of the frequency hopping areas is minimized;
processing means for processing interference information of a telecommunications system or of a predetermined part of the system; and
transferring means for transferring one or more users to another frequency hopping layer,
wherein the frequency hopping areas are at least essentially of a same size as radio cells of the telecommunication system.

9. The network element of claim 8, wherein the network element is synchronized with the telecommunications system allowing synchronous utilization of frequency hopping sequences.

10. The network element of claim 8, wherein the frequency hopping parameters of the layers differ from each other in order to prevent the layers from interfering with each other.

11. The network element of claim 8, wherein the frequency hopping layers have different frequency reuse factors.

12. The network element of claim 8, further comprising means for dividing a used frequency hopping band with the frequency hopping layers.

13. A network element utilizing frequency hopping, the network element comprising:
providing means for providing at least two frequency hopping layers, each layer comprising one or more frequency hopping areas, the frequency hopping layers having frequency hopping parameters divergent from each other;
setting means for setting the frequency hopping layers in such a way that overlapping of border zones of the frequency hopping areas is minimized;
processing means for processing interference information of a telecommunications system or of a predetermined part of the system; and
transferring means for transferring one or more users to another frequency hopping layer,
wherein the frequency hopping areas are of substantially a same size as a cell cluster comprising a predetermined number of radio cells of the telecommunication system.

14. A network element utilizing frequency hopping, the network element comprising:
providing means for providing at least two frequency hopping layers, each layer comprising one or more frequency hopping areas, the frequency hopping layers having frequency hopping parameters divergent from each other;

setting means for setting the frequency hopping layers in such a way that overlapping of border zones of the frequency hopping areas is minimized;

processing means for processing interference information of a telecommunications system or of a predetermined part of the system; and transferring means for transferring one or more users to another frequency hopping layer, wherein the interference information comprise results of carrier-to-interference (CIR) measuring.

15. A network element utilizing frequency hopping, the network element being configured to:

provide at least two frequency hopping layers, each layer comprising one or more frequency hopping areas, the frequency hopping layers having frequency hopping parameters divergent from each other;

set the frequency hopping layers in such a way that overlapping of border zones of the frequency hopping areas is minimized;

process interference information of a telecommunications system or of a predetermined part of the system; and transfer one or more users to another frequency hopping layer, wherein the frequency hopping areas are at least essentially of a same size as radio cells of the telecommunication system.

16. A data transmission system using frequency hopping and having a limit for allowable interference, the data transmission system comprising:

means for providing at least two frequency hopping layers, each layer comprising one or more frequency hopping areas, the frequency hopping layers having frequency hopping parameters divergent from each other;

means for seffing the frequency hopping layers one on the other in such a way that overlapping of border zones of the frequency hopping areas is minimized;

means for measuring interference in the system or in a predetermined part of the system and for comparing the interference to the limit; and means for transferring one or more users to another frequency hopping layer, wherein the frequency hopping areas are at least essentially of a same size as radio cells of the system.

17. A data transmission system using frequency hopping and having a limit for allowable interference, the data transmission system being configured to:

provide at least two frequency hopping layers, each layer comprising one or more frequency hopping areas, the frequency hopping layers having frequency hopping parameters divergent from each other;

set the frequency hopping layers one on the other in such a way that overlapping of border zones of the frequency hopping areas is minimized;

measure interference in the system or in a predetermined part of the system and for comparing the interference to the limit; and transfer one or more users to another frequency hopping layer, wherein the frequency hopping areas are at least essentially of a same size as radio cells of the system.

18. A network element utilizing frequency hopping, the network element comprising:

a providing unit configured to provide at least two frequency hopping layers, each layer comprising one or more frequency hopping areas, the frequency hopping layers having frequency hopping parameters divergent from each other;

a setting unit configured to set the frequency hopping layers in such a way that overlapping of border zones of the frequency hopping areas is minimized;

a processor configured to process interference information of a telecommunications system or of a predetermined part of the system; and a transferring unit configured to transfer one or more users to another frequency hopping layer, wherein the frequency hopping areas are at least essentially of a same size as radio cells of the telecommunication system.

19. The network element of claim 18, wherein the network element is synchronized with the telecommunications system allowing synchronous utilization of frequency hopping sequences.

20. The network element of claim 18, wherein the frequency hopping parameters of the layers differ from each other in order to prevent the layers from interfering with each other.

21. The network element of claim 18, wherein the frequency hopping layers have different frequency reuse factors.

22. The network element of claim 18, further comprising a dividing unit configured to divide a used frequency hopping band with the frequency hopping layers.

23. A network element utilizing frequency hopping, the network element comprising:

a providing unit configured to provide at least two frequency hopping layers, each layer comprising one or more frequency hopping areas, the frequency hopping layers having frequency hopping parameters divergent from each other;

a setting unit configured to set the frequency hopping layers in such a way that overlapping of border zones of the frequency hopping areas is minimized;

a processor configured to process interference information of a telecommunications system or of a predetermined part of the system; and a transferring unit configured to transfer one or more users to another frequency hopping layer, wherein the frequency hopping areas are of substantially a same size as a cell cluster comprising a predetermined number of radio cells of the telecommunication system.

24. A network element utilizing frequency hopping, the network element comprising:

a providing unit configured to provide at least two frequency hopping layers, each layer comprising one or more frequency hopping areas, the frequency hopping layers having frequency hopping parameters divergent from each other;

a setting unit configured to set the frequency hopping layers in such a way that overlapping of border zones of the frequency hopping areas is minimized;

a processor configured to process interference information of a telecommunications system or of a predetermined part of the system; and a transferring unit configured to transfer one or more users to another frequency hopping layer, wherein the interference information comprise results of carrier-to-interference (CIR) measuring.

* * * * *